United States Patent
Daher et al.

(10) Patent No.: US 10,289,966 B2
(45) Date of Patent: May 14, 2019

(54) DYNAMIC SEATING AND WORKSPACE PLANNING

(71) Applicant: FMR LLC, Boston, MA (US)

(72) Inventors: Ameed Daher, Cary, NC (US); William David Ewing, Chapel Hill, NC (US)

(73) Assignee: FMR LLC, Boston, MA (US)

( * ) Notice: Subject to any disclaimer, the term of this patent is extended or adjusted under 35 U.S.C. 154(b) by 555 days.

(21) Appl. No.: 15/057,838

(22) Filed: Mar. 1, 2016

(65) Prior Publication Data

US 2017/0255880 A1 Sep. 7, 2017

(51) Int. Cl.
| | |
|---|---|
| G06K 9/00 | (2006.01) |
| H04L 29/06 | (2006.01) |
| H04N 7/18 | (2006.01) |
| G06Q 10/02 | (2012.01) |

(52) U.S. Cl.
CPC ......... *G06Q 10/02* (2013.01); *G06K 9/00771* (2013.01); *H04L 63/0861* (2013.01); *H04N 7/183* (2013.01)

(58) Field of Classification Search
CPC ................ G06Q 10/02; G06K 9/00771; H04L 63/0861; H04N 7/183
See application file for complete search history.

(56) References Cited

U.S. PATENT DOCUMENTS

| | | | |
|---|---|---|---|
| 6,972,660 B1 * | 12/2005 | Montgomery, Jr. | G07C 9/00158 340/5.52 |
| 7,289,619 B2 | 10/2007 | Vivadelli et al. | |
| 7,516,010 B1 * | 4/2009 | Kaplan | G01C 21/30 701/426 |
| 7,538,690 B1 * | 5/2009 | Kaplan | G01C 21/20 340/932.2 |
| 7,634,662 B2 * | 12/2009 | Monroe | G06K 9/00221 382/117 |
| 8,041,586 B2 * | 10/2011 | Jethani | G06Q 10/02 705/5 |

(Continued)

OTHER PUBLICATIONS

Nijholt, "Online and off-line visualization of meeting information and meeting support", Springer-Verlag, Aug. 5, 2006 (Year: 2006).*

*Primary Examiner* — Kevin H Flynn
*Assistant Examiner* — Omar Zeroual
(74) *Attorney, Agent, or Firm* — Proskauer Rose LLP

(57) ABSTRACT

Methods and apparatuses are described for dynamic seating and workspace planning. A server computing device determines an identity and a workspace location of people within a facility by analyzing digital images from cameras at the facility and data elements of interactions with hardware devices at the facility. The server computing device determines the workspace location for each person within the facility using (i) a physical location associated with a digital image in which the person appears and (ii) a physical location associated with at least one of the hardware devices being used by the person. The server computing device generates a workspace reservation chart indicating a portion of workspace locations currently being used and a portion of workspace locations reserved for future use. The server computing device provides advice to remove computing devices regarding available workspace locations at the facility.

25 Claims, 4 Drawing Sheets

(56) References Cited

U.S. PATENT DOCUMENTS

| | | | | |
|---|---|---|---|---|
| 8,150,718 B2* | 4/2012 | Olliphant | G06Q 10/06314 | 705/7.19 |
| 8,346,589 B1* | 1/2013 | Norton | G06Q 10/1093 | 705/7.18 |
| 8,395,968 B2* | 3/2013 | Vartanian | G01S 15/08 | 367/99 |
| 8,484,151 B1* | 7/2013 | Lookingbill | G06Q 10/04 | 706/46 |
| 8,613,070 B1* | 12/2013 | Borzycki | G06F 21/6218 | 726/8 |
| 8,816,880 B1* | 8/2014 | Foster | G08G 1/146 | 340/932.2 |
| 9,177,475 B2* | 11/2015 | Sellschopp | G01C 21/3484 | |
| 9,640,079 B1* | 5/2017 | Moravek | G08G 5/0013 | |
| 9,723,035 B1* | 8/2017 | Siddiqui | H04L 65/403 | |
| 9,766,079 B1* | 9/2017 | Poel | G01S 5/0242 | |
| 9,955,318 B1* | 4/2018 | Scheper | H04W 4/043 | |
| 2003/0085929 A1* | 5/2003 | Huber | G05B 19/042 | 715/810 |
| 2004/0032342 A1* | 2/2004 | Dunning | G08G 1/14 | 340/932.2 |
| 2004/0117194 A9* | 6/2004 | Lee | H04L 12/1822 | 709/205 |
| 2004/0181439 A1* | 9/2004 | Kakuta | G06Q 10/02 | 705/5 |
| 2004/0254721 A1* | 12/2004 | Saiki | G01C 21/3438 | 701/410 |
| 2004/0267623 A1* | 12/2004 | Vivadelli | G06Q 50/01 | 379/212.01 |
| 2005/0071213 A1* | 3/2005 | Kumhyr | G06Q 10/0631 | 705/7.12 |
| 2005/0114274 A1* | 5/2005 | Dube | G06Q 10/06 | 705/400 |
| 2005/0163346 A1* | 7/2005 | van den Bergen | G06K 9/00771 | 382/103 |
| 2006/0031105 A1* | 2/2006 | Lee | G06Q 10/02 | 705/5 |
| 2006/0068787 A1* | 3/2006 | Deshpande | G06Q 30/02 | 455/435.3 |
| 2006/0187859 A1* | 8/2006 | Shaffer | H04L 12/1877 | 370/260 |
| 2007/0156301 A1* | 7/2007 | Muinonen | B61L 17/00 | 701/19 |
| 2007/0162315 A1* | 7/2007 | Hodges | G06Q 10/02 | 705/7.12 |
| 2008/0033640 A1* | 2/2008 | Amano | G01C 21/3476 | 701/414 |
| 2008/0048885 A1* | 2/2008 | Quinn | G08G 1/143 | 340/932.2 |
| 2008/0079569 A1* | 4/2008 | Axelsen | G06Q 10/02 | 340/541 |
| 2008/0109289 A1* | 5/2008 | Vivadelli | G06Q 10/02 | 705/314 |
| 2009/0106077 A1* | 4/2009 | Bhogal | G06Q 10/025 | 705/7.19 |
| 2009/0132579 A1* | 5/2009 | Kwang | H04L 67/22 | |
| 2009/0193217 A1* | 7/2009 | Korecki | G06Q 10/087 | 711/170 |
| 2009/0210491 A1* | 8/2009 | Thakkar | H04L 12/1822 | 709/204 |
| 2009/0265280 A1* | 10/2009 | Taneja | G06Q 10/109 | 705/80 |
| 2009/0300174 A1* | 12/2009 | Floris | G06Q 10/06 | 709/224 |
| 2009/0315678 A1* | 12/2009 | Padmanabhan | H04Q 9/00 | 340/10.1 |
| 2010/0036689 A1 | 2/2010 | Halavais et al. | | |
| 2010/0097226 A1* | 4/2010 | Parsons | G08B 13/19 | 340/573.1 |
| 2011/0030037 A1* | 2/2011 | Olshansky | H04L 12/4641 | 726/4 |
| 2011/0071862 A1* | 3/2011 | Cator | G06Q 10/02 | 705/5 |
| 2011/0096135 A1* | 4/2011 | Hegde | H04N 5/23219 | 348/14.07 |
| 2011/0184768 A1* | 7/2011 | Norton | G06Q 10/02 | 705/5 |
| 2011/0244798 A1* | 10/2011 | Daigle | H04L 63/08 | 455/41.2 |
| 2012/0098677 A1* | 4/2012 | Geelen | G01C 21/32 | 340/932.2 |
| 2012/0136997 A1* | 5/2012 | Yan | G06Q 10/06313 | 709/225 |
| 2012/0179502 A1* | 7/2012 | Farooq | G06Q 10/06311 | 705/7.13 |
| 2012/0185291 A1* | 7/2012 | Ramaswamy | G06Q 10/1095 | 705/7.19 |
| 2012/0233077 A1* | 9/2012 | Tate, Jr. | G06Q 10/20 | 705/65 |
| 2012/0278408 A1* | 11/2012 | Seferian | G06Q 10/1095 | 709/206 |
| 2012/0293599 A1* | 11/2012 | Norlin | G06K 9/00221 | 348/14.01 |
| 2012/0293605 A1* | 11/2012 | Seferian | H04N 7/147 | 348/14.08 |
| 2012/0310520 A1* | 12/2012 | Kanno | G01C 21/3423 | 701/400 |
| 2013/0019241 A1* | 1/2013 | Leitz | G06F 9/5027 | 718/1 |
| 2013/0047175 A1* | 2/2013 | Ramirez Flores | H04H 60/45 | 725/12 |
| 2013/0166629 A1* | 6/2013 | Ivashin | H04L 63/10 | 709/203 |
| 2013/0176147 A1* | 7/2013 | Anderson | G08G 1/143 | 340/932.2 |
| 2013/0262686 A1* | 10/2013 | Hill | H04L 65/1069 | 709/228 |
| 2013/0265174 A1* | 10/2013 | Scofield | G01C 21/34 | 340/932.2 |
| 2013/0268187 A1* | 10/2013 | Scofield | G01C 21/3685 | 701/400 |
| 2014/0046716 A1* | 2/2014 | Black | G06Q 10/06314 | 705/7.19 |
| 2014/0052374 A1* | 2/2014 | Hoch | G01C 21/343 | 701/533 |
| 2014/0058711 A1* | 2/2014 | Scofield | G06Q 10/04 | 703/6 |
| 2014/0109210 A1* | 4/2014 | Borzycki | A63F 13/213 | 726/7 |
| 2014/0111520 A1* | 4/2014 | Cline | H04W 4/70 | 345/440 |
| 2014/0195277 A1* | 7/2014 | Kim | G06Q 10/02 | 705/5 |
| 2014/0223533 A1* | 8/2014 | Vitali | H04L 63/08 | 726/7 |
| 2014/0236876 A1* | 8/2014 | Hapse | G06N 3/08 | 706/18 |
| 2014/0249742 A1* | 9/2014 | Krivacic | G06Q 10/02 | 701/400 |
| 2014/0257883 A1* | 9/2014 | Thompson | G06Q 10/02 | 705/5 |
| 2014/0278594 A1* | 9/2014 | Vivadelli | G06Q 10/02 | 705/5 |
| 2014/0359718 A1* | 12/2014 | Turunen | G06Q 10/06 | 726/4 |
| 2015/0033305 A1* | 1/2015 | Shear | G06F 21/45 | 726/11 |
| 2015/0039357 A1* | 2/2015 | Segal | G06Q 10/06314 | 705/5 |
| 2015/0058927 A1* | 2/2015 | Rowe | H04L 63/0869 | 726/3 |
| 2015/0094097 A1* | 4/2015 | Fraccaroli | H04W 4/021 | 455/456.3 |
| 2015/0143153 A1* | 5/2015 | German | H04Q 1/136 | 713/324 |
| 2015/0150105 A1* | 5/2015 | Takegawa | H04L 12/1822 | 726/7 |

(56) References Cited

U.S. PATENT DOCUMENTS

| | | | | |
|---|---|---|---|---|
| 2015/0193739 A1* | 7/2015 | Min | G06Q 10/1095 | 705/7.19 |
| 2015/0242827 A1* | 8/2015 | Guo | G06Q 20/145 | 705/13 |
| 2015/0279217 A1* | 10/2015 | Chen | G08G 5/003 | 701/123 |
| 2016/0012726 A1* | 1/2016 | Wang | G08G 1/0112 | 340/932.2 |
| 2016/0019486 A1* | 1/2016 | Zeng | H04L 67/16 | 705/7.24 |
| 2016/0065690 A1* | 3/2016 | Hanyu | G06F 3/0488 | 715/746 |
| 2016/0094355 A1* | 3/2016 | Waltermann | H04L 12/1822 | 715/755 |
| 2016/0127875 A1* | 5/2016 | Zampini, II | H04W 4/043 | 370/311 |
| 2016/0162838 A1* | 6/2016 | Torkian | G06Q 10/107 | 709/206 |
| 2016/0163197 A1* | 6/2016 | Levy | G08G 1/147 | 340/932.2 |
| 2016/0180256 A1* | 6/2016 | Renaud | G06Q 10/02 | 705/5 |
| 2016/0180259 A1* | 6/2016 | Marianko | G06Q 10/02 | 705/5 |
| 2016/0202941 A1* | 7/2016 | McLeod | G06F 3/14 | 715/771 |
| 2016/0231136 A1* | 8/2016 | Hoch | G01C 21/3605 | |
| 2016/0275470 A1* | 9/2016 | Straw | G06Q 30/06 | |
| 2016/0285785 A1* | 9/2016 | Thye | H04L 47/822 | |
| 2016/0286624 A1* | 9/2016 | Patel | H05B 37/0218 | |
| 2016/0371608 A1* | 12/2016 | Kahng | G06Q 10/02 | |
| 2017/0013069 A1* | 1/2017 | Grohman | H04L 67/22 | |
| 2017/0076156 A1* | 3/2017 | Borel | G06K 9/00711 | |
| 2017/0083872 A1* | 3/2017 | Blomberg | G06Q 10/1095 | |
| 2017/0118307 A1* | 4/2017 | Beaurepaire | G01C 21/3685 | |
| 2017/0142581 A1* | 5/2017 | Tarmey | G07C 9/00087 | |
| 2017/0148324 A1* | 5/2017 | High | G08G 1/144 | |
| 2017/0206471 A1* | 7/2017 | Dermosessian | G01C 21/3679 | |
| 2017/0208664 A1* | 7/2017 | Mead | H05B 37/0227 | |
| 2017/0220966 A1* | 8/2017 | Wang | G06Q 10/08 | |
| 2017/0228953 A1* | 8/2017 | Lupovici | G07C 9/00309 | |
| 2017/0241796 A1* | 8/2017 | Wakayama | G08G 1/0968 | |
| 2018/0082264 A1* | 3/2018 | Szeto | G06Q 10/1095 | |
| 2018/0111494 A1* | 4/2018 | Penilla | H02J 7/0027 | |
| 2018/0143025 A1* | 5/2018 | Kurata | G01C 21/26 | |

* cited by examiner

DYNAMIC SEATING AND WORKSPACE PLANNING

TECHNICAL FIELD

This application relates generally to methods and apparatuses, including computer program products, for dynamic seating and workspace planning.

BACKGROUND

As businesses grow, they face increased global competition and a higher demand for their goods and services—which in turn results in a need for hiring additional employees. This hiring process may cause the business to outgrow its current facilities in terms of providing available workspaces to its employees.

To address office space scarcity, many companies are shifting to dynamic (unassigned) seating where employees may commute to different work facilities depending upon a variety of factors. The concept of dynamic seating reduces costs associated with maintaining workspace facilities, but there are times when a facility fills up and employees must find workspaces either at an alternate facility, or at home.

Often, the reservation and management of dynamic seating programs is time-consuming and cumbersome and lacks real-time, automated features that can provide targeted seating advice to an employee looking for a workspace. For example, existing kiosks and other on-site space management tools available in current dynamic seating environments are not smart enough to provide real-time information about how many and which seats are available at any given moment. Also, because those systems are usually not available to a person 'on the go,' an inbound employee wastes time and expense in traveling to a work facility before the employee knows whether he or she will have an available workstation upon arrival.

SUMMARY

Therefore, what is needed are methods and systems for dynamic reservation and planning of seating and workspaces to provide the capability of generating up-to-date, real-time seating charts and information about a facility's status and fill up time, so employees can make timely decisions on whether or not they should find an alternate space to work, or make a seating reservation.

As described herein, the systems and methods make seating decisions based on factors such as the time at which an inbound employee will arrive at the site according on their distance and mode of transportation (as tracked via mobile device), as well as their priority in the organization and personal seating preferences—and then suggest seating based upon these factors. The systems and methods automatically determine the identity and workspace location of employees currently within the facility based upon a variety of inputs including customized facial recognition techniques and leveraging technology fingerprints of particular users, which enables the system to 'see' employees in real-time and recognize where they are sitting.

The systems and methods described herein also enhance the dynamic seating environment by advising employees of a current status of a particular work facility (or facilities) and by presenting the employees with a real-time seating and reservation chart through, e.g., a mobile device before the employees arrive. The employees are able to set up advance reservations for workspaces so that each employee is ensured to have a reserved workspace in advance (if any are available) and, depending on the person's preferences, the system advises the employee which workspaces fit their preferences (e.g., location, proximity to other employees, available technology resources, and the like).

The invention, in one aspect, features a computerized method for dynamic seating and workspace planning. A server computing device determines an identity and a workspace location of each of one or more people within a facility. One or more cameras coupled to the server computing device capture digital images of at least one of the people within the facility. The server computing device extracts digitized facial features of the people appearing in the images and comparing the facial features to a database of facial images to identify the people appearing in the images. One or more hardware devices distributed throughout the facility and coupled to the server computing device capture data elements generated from interactions by the people with the hardware devices, where the data elements include user identification credentials and user access transactions recorded by the hardware device. The server computing device analyzes the data elements to identify the people interacting with the hardware devices. The server computing device determines the workspace location being utilized by each of the identified people within the facility using (i) a physical location associated with a digital image in which the person appears, based upon a physical location of the camera that captured the digital image; and (ii) a physical location associated with at least one of the hardware devices being used by the person, based upon a physical location of the hardware device. The server computing device generates a workspace reservation chart indicating a portion of workspace locations currently being used and a portion of workspace locations reserved for future use. The server computing device receives a request from a remote computing device to reserve a workspace location within the facility, the request including an identifier associated with a requesting user. The server computing device retrieves a user profile based upon the requesting user identifier, the user profile including workspace location preferences and workspace capability preferences of the requesting user. The server computing device determines an available workspace location for the requesting user based upon the user profile and the workspace reservation chart and provides the available workspace location to the remote computing device for display.

The invention, in another aspect, features a system for dynamic seating and workspace planning. The system includes a server computing device configured to determine an identity and a workspace location of each of one or more people within a facility. One or more cameras coupled to the server computing device are configured to capture digital images of at least one of the people within the facility. The server computing device is further configured to extract digitized facial features of the people appearing in the images and comparing the facial features to a database of facial images to identify the people appearing in the images. One or more hardware devices distributed throughout the facility and coupled to the server computing device are configured to capture data elements generated from interactions by the people with the hardware devices, where the data elements include user identification credentials and user access transactions recorded by the hardware device. The server computing device is further configured to analyze the data elements to identify the people interacting with the hardware devices. The server computing device is further configured to determine the workspace location being utilized by each of the identified people within the facility using (i) a physical location associated with a digital image in which the person appears, based upon a physical location of the camera that captured the digital image; and (ii) a physical location associated with at least one of the hardware devices being used by the person, based upon a physical location of the hardware device. The server computing device is further configured to generate a workspace reservation chart indicating a portion of workspace locations currently being used and a portion of workspace locations reserved for future use. The server computing device is further configured to receive a request from a remote computing device to reserve a workspace location within the facility, the request including an identifier associated with a requesting user. The server computing device is further configured to retrieve a user profile based upon the requesting user identifier, the user profile including workspace location preferences and workspace capability preferences of the requesting user. The server computing device is further configured to determine an available workspace location for the requesting user based upon the user profile and the workspace reservation chart and provides the available workspace location to the remote computing device for display.

The invention, in another aspect, features a computer program product, tangibly embodied in a non-transitory computer readable storage device, for dynamic seating and workspace planning. The computer program product includes instructions operable to cause a server computing device to determine an identity and a workspace location of each of one or more people within a facility. One or more cameras coupled to the server computing device are configured to capture digital images of at least one of the people within the facility. The computer program product further includes instructions operable to cause the server computing device to extract digitized facial features of the people appearing in the images and comparing the facial features to a database of facial images to identify the people appearing in the images. One or more hardware devices distributed throughout the facility and coupled to the server computing device are configured to capture data elements generated from interactions by the people with the hardware devices, where the data elements include user identification credentials and user access transactions recorded by the hardware device. The computer program product further includes instructions operable to cause the server computing device to analyze the data elements to identify the people interacting with the hardware devices. The computer program product further includes instructions operable to cause the server computing device to determine the workspace location being utilized by each of the identified people within the facility using (i) a physical location associated with a digital image in which the person appears, based upon a physical location of the camera that captured the digital image; and (ii) a physical location associated with at least one of the hardware devices being used by the person, based upon a physical location of the hardware device. The computer program product further includes instructions operable to cause the server computing device to generate a workspace reservation chart indicating a portion of workspace locations currently being used and a portion of workspace locations reserved for future use. The computer program product further includes instructions operable to cause the server computing device to receive a request from a remote computing device to reserve a workspace location within the facility, the request including an identifier associated with a requesting user. The computer program product further includes instructions operable to cause the server computing device to retrieve a user profile based upon the requesting user identifier, the user profile including workspace location preferences and workspace capability preferences of the requesting user. The computer program product further includes instructions operable to cause the server computing device to determine an available workspace location for the requesting user based upon the user profile and the workspace reservation chart and provides the available workspace location to the remote computing device for display Any of the above aspects can include one or more of the following features. In some embodiments, capturing data elements generated from interactions by the people with the hardware devices comprises capturing, by the hardware devices, one or more physical access events relating to interactions with security system hardware controlling physical access to locations within the facility. In some embodiments, the interactions with security system hardware comprise presenting an access credential to a security reader. In some embodiments, the access credential includes an access badge, a biometric data element, or a passcode.

In some embodiments, capturing data elements generated from interactions by the people with the hardware devices comprises capturing, by the hardware devices, one or more logical access events relating to interactions with computing devices located at a workspace location. In some embodiments, the interactions with computing devices comprise entering authentication credentials to log into the computing devices.

In some embodiments, providing the available workspace location to the remote computing device comprises providing the workspace reservation chart to the remote computing device and generating a graphical user interface for display on the remote computing device, the graphical user interface including a color-coded seating chart indicating which workspace locations are available, which workspace locations are reserved for future use, and which workspace locations are in use.

In some embodiments, determining an available workspace location comprises analyzing historical facility workspace data and historical user workspace data to predict current availability of workspace locations. In some embodiments, the server computing device automatically reserves a workspace location for the requesting user based upon the analysis of the historical facility workspace data and the historical user workspace data.

In some embodiments, determining an available workspace location comprises determining a geographic location of the remote computing device in relation to the facility and a mode of transportation of the employee, determining an estimated time of arrival for the requesting user based upon the geographic location and the mode of transportation, comparing the estimated time of arrival with a time that the facility is expected to reach capacity, and generating seating advice based upon the comparison step. In some embodiments, generating seating advice comprises if the estimated time of arrival is within a predetermined reservation time window and one or more workspace locations are available: transmitting a message to the remote computing device to recommend that the requesting user reserve a workspace location before arriving, if the estimated time of arrival is before the time that the facility is expected to reach capacity, is outside the predetermined reservation time window, and one or more workspace locations are available: transmitting a message to the remote computing device to inform the user to select a workspace location upon arrival, and if the estimated time of arrival is after the time that the facility is expected to reach capacity and is outside the predetermined reservation time window: transmitting a message to the remote computing device that no workspaces are available at the facility.

In some embodiments, if no workspaces are available at the facility and one or more workspaces are available at alternate facilities, the server computing device transmits a message to the remote computing device to divert the requesting user to one of the alternate facilities. In some embodiments, the server computing device monitors the captured digital images and the captured data elements to determine whether a previously identified person is still present at the workspace location. If the previously identified person is no longer present at the workspace location, the server computing device determines a period of time since the person was present at the workspace location, determines whether any of the interactions by the person with the hardware devices indicate that the person has left the facility, and makes the workspace location available for use by others if the period of time since the person was present at the workspace location exceeds a predetermined threshold or if an interaction by the person with the hardware devices indicates that the person has left the facility. In some embodiments, the server computing device compares a current time with predetermined working hours of the facility and makes the workspace location available for use by others if the current time is outside of the predetermined working hours, and if the period of time since the person was present at the workspace location exceeds a predetermined threshold or if an interaction by the person with the hardware devices indicates that the person has left the facility.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
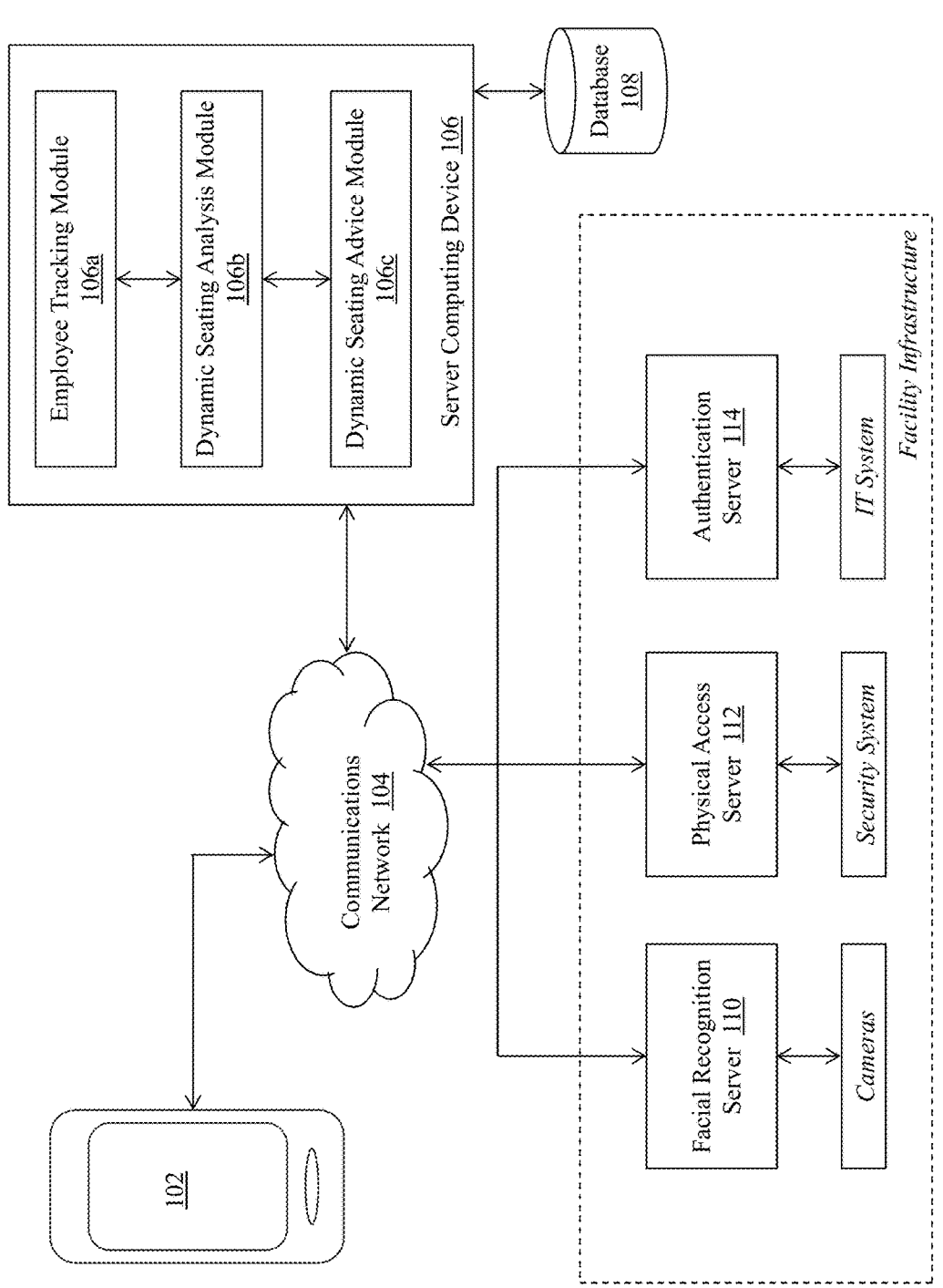
FIG. 1 is a block diagram of a system for dynamic seating and workspace planning.

FIG. 1 is a block diagram of a system 100 for dynamic seating and workspace planning. The system 100 includes a mobile computing device 102, a communications network 104, a server computing device 106 with an employee tracking module 106a, a dynamic seating analysis module 106b, and a dynamic seating advice module 106c, a database 108, a facial recognition server 110, a physical access server 112, and an authentication server 114.

The mobile computing device 102 uses software and circuitry (e.g., processor, memory) to execute applications and to communicate with the server computing device 106 via the communication network 104 (e.g., using an app installed on the device to connect to the Internet via an embedded wi-fi antenna) for the purpose of dynamic seating and workspace planning as described herein. The mobile device 102 further includes global positioning system (GPS) circuitry and functionality to enable determination of a location of the mobile device 102. Example mobile computing devices 102 can include, but are not limited to, a smart phone (e.g., Apple iPhone®, Windows®, and/or Android™-based device) or other similar mobile communications devices.

The communication network 104 enables components of the system 100 to communicate with each other using a packet-based protocol (e.g., IP). The network 104 may be a local network, such as a LAN, or a wide area network, such as the Internet. In some embodiments, the network 104 is comprised of several discrete networks and/or sub-networks (including related routing, load balancing, and traffic metering hardware).

The server computing device 102 is a device including specialized hardware and/or software modules that execute on a processor and interact with memory modules of the server computing device 102, to receive data from other components of the system 100, transmit data to other components of the system 100, and perform functions for dynamic seating and workspace planning as described herein. The server computing device 102 includes several computing modules 106a-106c (as mentioned above) that execute on the processor of the server computing device 106. In some embodiments, the modules 106a-106c are specialized sets of computer software instructions programmed onto one or more dedicated processors in the server computing device 106 and can include specifically-designated memory locations and/or registers for executing the specialized computer software instructions.

Although the modules 106a-106c are shown in FIG. 1 as executing within the same server computing device 106, in some embodiments the functionality of the modules 106a-106c can be distributed among a plurality of server computing devices. As shown in FIG. 1, the server computing device 106 enables the modules 106a-106c to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 106a-106c is described in detail below.

The employee tracking module 106a communicates with the other modules 106b, 106c of the server computing device 106, the database 108, and the subsystems 110, 112, 114 to provide functionality associated with determining the identity, location, and movement of employees at the work facilities (and in some embodiments, external to the work facilities) for the purpose of dynamic seating and workspace planning as described herein. For example, the employee tracking module 106a receives information from the subsystems 110, 112, 114 (as will be described in greater detail below) regarding identity and location of employees at one or more facilities, and monitors the information to generate a real-time view of which employees are in the facility and at which location/workspace the employees are situated. The employee tracking module 106a provides aspects of this information to the dynamic seating analysis module 106b in order to generate a dynamic seating chart, including the status of unavailable workspaces, available workspaces, and reserved workspaces as will be described in greater detail below.

The dynamic seating analysis module 106a communicates with the other modules 106b, 106c of the server computing device 106 and the database 108 to provide functionality associated with generating a dynamic workspace seating and reservation chart for one or more facilities (e.g., buildings, work areas, and the like) that includes the availability status of existing workspaces. For example, the dynamic seating analysis module 106b receives employee identification and location information from the employee tracking module 106a and associates the received information with one or more physical workspaces throughout the facility to generate a dynamic workspace reservation and seating chart that identifies which workspaces are currently occupied and by whom, and also which workspaces are currently unoccupied and therefore may be available for use. In addition, the dynamic seating analysis module 106b obtains seating reservation information from, e.g., database 108 in order to identify which workspaces are currently reserved by inbound employees and in some embodiments, the duration for which those reserved workspaces are intended to be occupied.

The database 108 is a computing device (or in some embodiments, a set of computing devices) coupled to the server computing device 106 and is configured to receive, generate, and store specific segments of data relating to the process of dynamic seating and workspace planning as described herein. In some embodiments, all or a portion of the database 108 can be integrated with the server computing device 106 or be located on a separate computing device or devices. The database 108 can comprise one or more databases configured to store portions of data used by the other components of the system 100, as will be described in greater detail below. An exemplary database 108 is MySQL™ available from Oracle Corp. of Redwood City, Calif.

The system 100 also include several subsystems that are associated with the physical and technical infrastructure of one or more work facilities, and which provide information to the modules 106a-106c of the server computing device 106 relating to the identification, location, and workspace status of employees at the facilities. The facial recognition server 110 interfaces with one or more cameras positioned at various locations throughout the facility to obtain digital video and/or images of the locations, such as workspaces, meeting rooms, entry areas and the like, which may capture employees within the facility.

The facial recognition server 110 includes customized software and related algorithms to analyze the digital video to determine the identity of any person(s) in the video images. The facial recognition server 100 is coupled to one or more high-definition video cameras that monitor the workspaces. Each camera transmits a digitized video stream to the facial recognition server 110, which executes custom software that leverages both existing facial recognition algorithms as well as proprietary facial recognition algorithms to match faces of people at the workspaces in the facility against images stored in, e.g., either a human resources (HR) or security badge database (such as database 108) to determine the identity of a person at any given workspace. For example, the facial recognition algorithm segments features such as eyes, forehead, nose, and chin regions of the face which are less prone to expression, and uses a secondary feature transform algorithm to create a digitized map of the face for quickly matching 2D images in the database 108 against the fluid-motion 3D images in the digitized video stream obtained from the cameras.

The physical access server 112 collects information from a building security system deployed in the facility regarding physical access events (e.g., door access, badge scans, and so forth) occurring at various security hardware throughout the facility in order to understand the identity of employees present at the facility as well as the location and movement of the employees throughout the facility, including the workspaces. For example, upon detecting that an employee has swiped his or her badge at an access point to enter the building, the physical access server 112 can, e.g., identify the employee that is entering the building and provide that information to the server computing device 106.

The authentication server 114 collects information from an information technology system at the facility regarding employee access events in the computing infrastructure (e.g., terminals, IP phones and the like) in order to understand the identity of employees present at the facility as well as the location of the employees at the facility. For example, a user may sit down at a particular workspace and log into the computer terminal by providing a user name and password. The authentication server 114 receives the login request, authenticates the user, and also provides the information (including the terminal at which the user is logging in) to the server computing device 106.

Additional detail about how the components of the system 100 operate together to achieve the advantages of the methods and systems described herein are provided below.

Figure 2A:
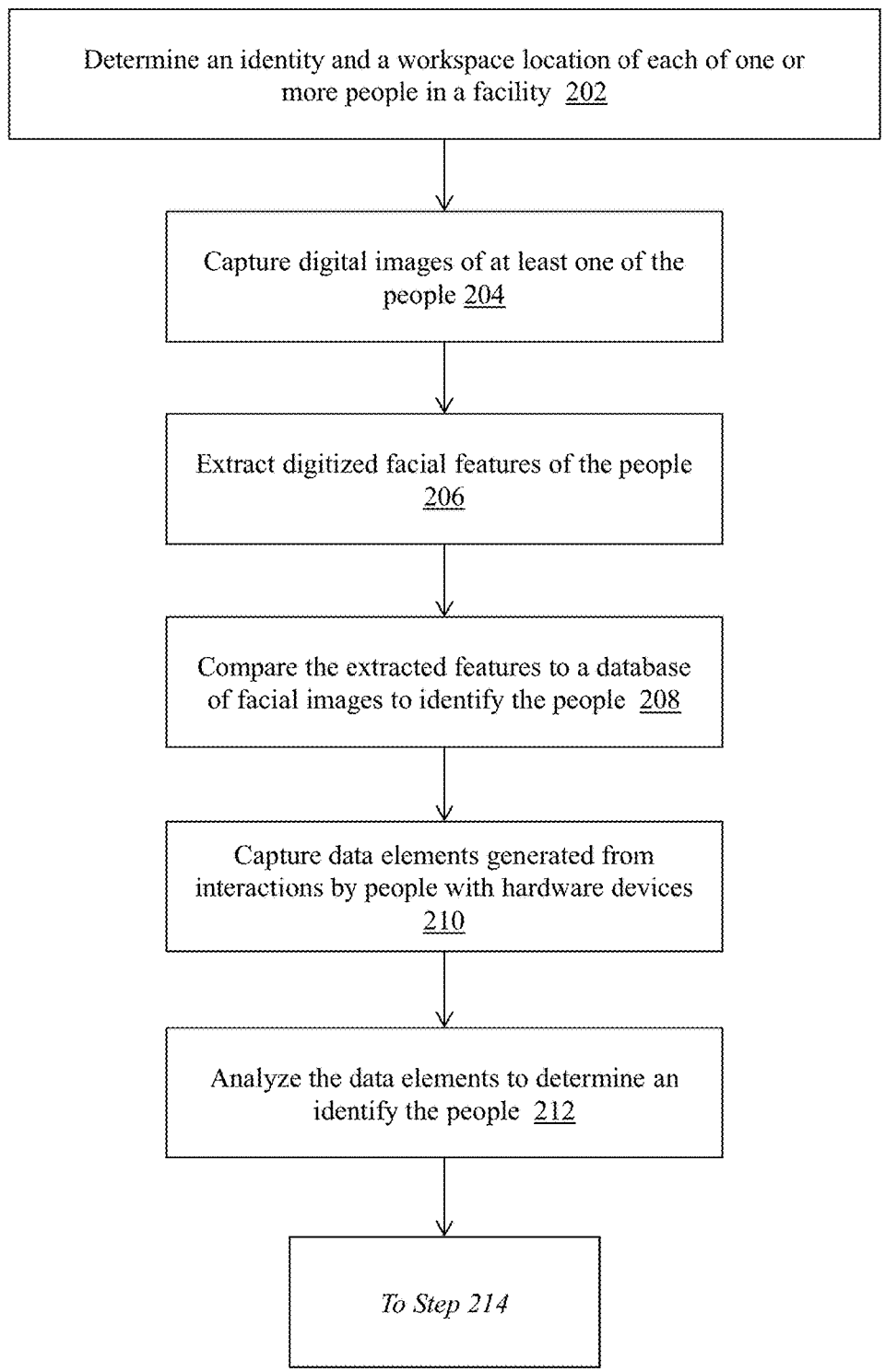
FIGS. 2A and 2B comprise a flow diagram of a method for dynamic seating and workspace planning.
Figure 2B:
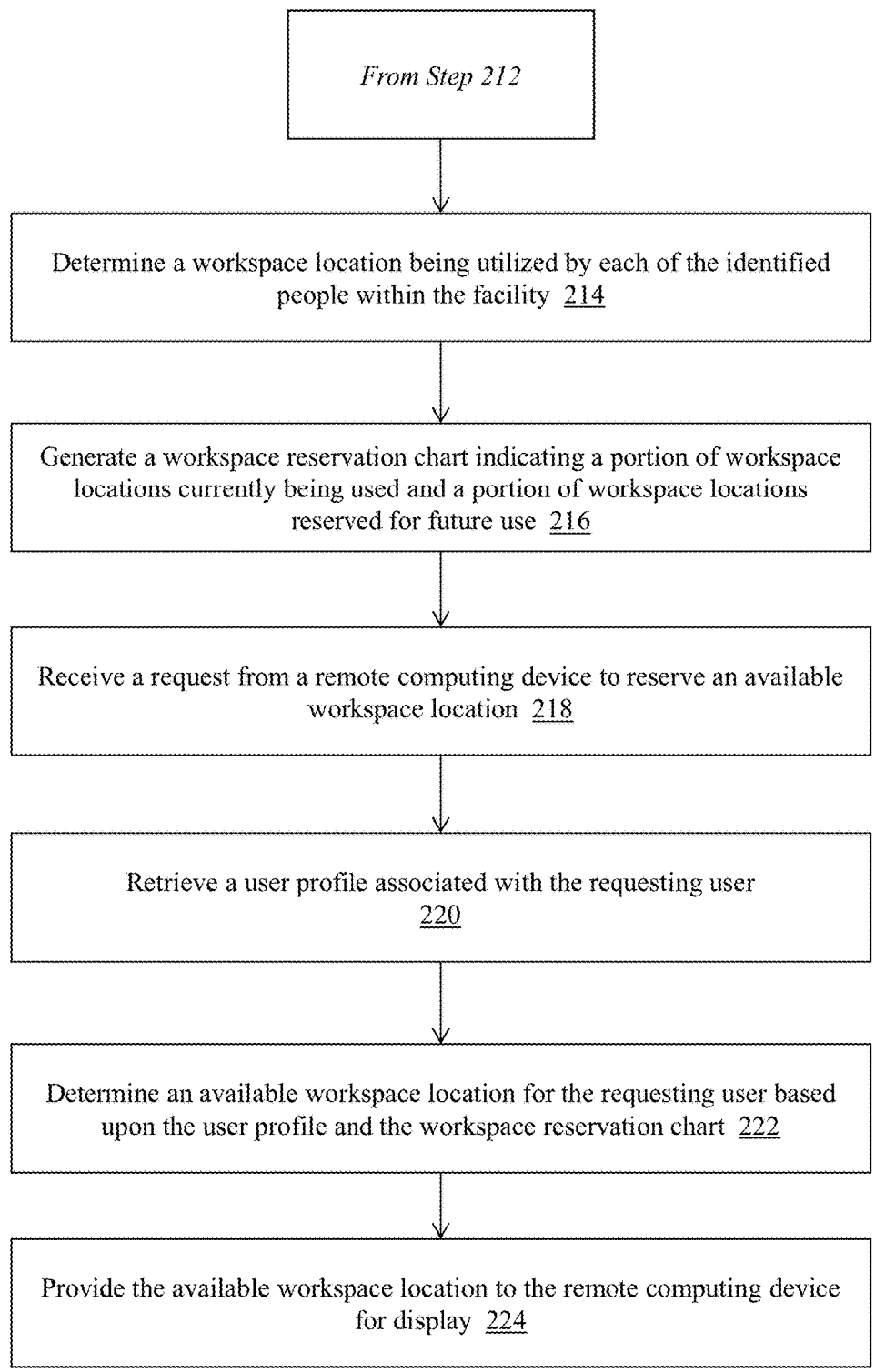

FIGS. 2A and 2B comprise a flow diagram of a method 200 for dynamic seating and workspace planning, using the system 100 of FIG. 1. Beginning with FIG. 2A, the server computing device 106 determines (202) an identity and a workspace location for each of one or more people within a facility. As described above, the employee tracking module 106a periodically (or continuously) receives information from the subsystems 110, 112, 114 at one or more facilities regarding employee activity at the facility. For example, cameras coupled to the facial recognition server 110 capture (204) digital images of at least one of the people within the facility and the facial recognition server extracts (206) digitized facial features of the people appearing in the images. The facial recognition server 112 then compares (208) the facial features to a database of facial images (e.g., stored in database 108) to identify the people appearing in the images and provides this information to the employee tracking module 106.

Similarly, hardware devices distributed throughout the facility and coupled to the physical access server 112 and the authentication server 114 capture (210) data elements generated from interactions by the people with the hardware devices. For example, the physical access server 112 receives physical access events (e.g., badge reads, presence events) from hardware such as readers, motion sensors, and the like that are distributed throughout the facility. The physical access events can include identification elements, such as a user ID, badge ID, and biometric information. The physical access server 112 can analyze (212) the data elements to determine an identity of the user that triggered the physical access event or otherwise interacted with the hardware.

The authentication server 114 captures (212) logical access events (e.g., login attempts) from hardware such as computer terminals and phones distributed at workspaces throughout the facility. The logical access events can include identification elements, such as user credentials (ID, password, biometric information). The authentication server 114 can analyze (212) the identification elements to determine an identity of the user that triggered the logical access event or otherwise interacted with the hardware.

Turning to FIG. 2B, the employee tracking module 106a correlates the information received from the subsystems 110, 112, 114 to determine (214) a workspace location being utilized by each of the identified people within the facility, that is, (i) which employees are currently in the facility and (ii) where those employees are physically located in the facility. In some embodiments, the employee tracking module 106a uses at least two data elements to determine the workspace location: (1) a physical location associated with a digital image obtained by the facial recognition server 112, based upon a physical location of the camera that capture the digital image; and (2) a physical location associated with at least one of the hardware devices being used by the person, based upon a physical location of the hardware device as determined by either the physical access server 112 or the authentication server 114 (or both).

For example, the employee tracking module 106a can receive information from the facial recognition server 110 that Employee X was observed by Camera One (which views several workspaces on the first floor, including Workspace N). The employee tracking module 106a can also receive information from the physical access server 112 that Employee X swiped her badge at a security reader located near the entrance to the facility earlier that morning and has not swiped her badge since then. The employee tracking module 106a can also receive information from the authentication server 114 that Employee X's credentials were used to log into a computer workstation at Workspace N shortly after the badge swipe was recorded by the physical access server 112. The employee tracking module 106a can correlate this information to determine that Employee X is present at the facility and is currently working at Workspace N.

Based upon the employee tracking performed by the employee tracking module 106a, the dynamic seating analysis module 106b generates (216) a workspace reservation chart indicating a portion of workspace locations currently being used and a portion of workspace locations reserved for future use. For example, the dynamic seating analysis module 106b creates a data structure that contains all of the workspace locations that exist in a particular facility. The dynamic seating analysis module 106b receives the group of currently-utilized workspace locations (and the corresponding employee identities) from the employee tracking module 106a and populates the data structure to indicate (i) which workspace locations are in use and (ii) by whom. The dynamic seating analysis module 106b also retrieves a list of currently-reserved workspace locations (that is, workspaces that are not yet occupied but will be in the near future) from database 108 and populates the data structure to indicate the workspace locations that are reserved and by whom.

The dynamic seating analysis module 106b receives (218) a request from a remote computing device (e.g., mobile device 102) to reserve an available workspace location within a facility. For example, the mobile device 102 can include an application that, when executed, launches a user interface on a display of the mobile device 102 to enable a user to submit the request to reserve a workspace location. The request can include parameters used by the server computing device 106 to determine whether a workspace location is available for the user. The parameters can include, but are not limited to, an identifier associated with the requesting user (e.g., username, user ID, device ID, employee number) that the server computing device 106 uses to retrieve (220) a user profile associated with the requesting user in database 108.

In some embodiments, the user profile includes information relating to the user's workspace location preferences—such as identification of a facility (e.g., which site is preferred), physical location within the facility (e.g., floor, wing, proximity to windows, proximity to other areas of the facility), resources or amenities (e.g., availability of certain equipment like video conferencing systems and/or specialized computer hardware, size of workspace and/or room, and so forth), proximity to other employees (e.g., close to other team members or support staff), time preferences (e.g., start/end times, duration of use), recurrence of reservations, vacation times, and the like. In some embodiments, any or all of the information contained in the user profile can be obtained via the application executing on the mobile device 102. For example, the mobile device 102 can present a user-fillable form on the display to enable a user to enter certain criteria associated with his or her reservation request in lieu of obtaining the information from the user profile—e.g., in some situations a user may wish to replace or override the information contained within his user profile.

In some embodiments, a system administrator or other 'power user' is able to enter facility configuration information and user configuration information into the database 108 via either the mobile application on the mobile device 102, or via the server computing device 106 using an administrative web site, in order to initially establish the dataset used by the system 100. The user configuration data can include user information such as employee name, address, phone number, employee number or ID, photo, the employee's priority within the organization (e.g., their job title, role, VIP status, etc.), as well as the employee's manager(s). The facility configuration data can include facilities data such as site name, site location, number of seats at the site, and each seat's ID (e.g., name or serial number)—as well as a data structure that comprises a seating layout for the facility. The facility configuration information can further include information such as reservation advice time, which is a time window or range (e.g., fifteen minutes) around the estimated 'fill-up' time of the facility during which a reservation is recommended, away time which is an amount of time an employee can be away from a workspace before the system marks a seat as empty, and work start and stop times which denote the site's work hours.

The dynamic seating analysis module 106b then determines (222) an available workspace location (or locations) for the requesting user based upon the user profile and the workspace reservation chart and transmits the available workspace location(s) to the dynamic seating advice module 106c. For example, the dynamic seating analysis module 106b can determine that only one workspace location is available that meets the criteria established in the user profile. In this example, the dynamic seating advice module 106c provides (224) the available workspace location to the remote computing device 102 for display (e.g., text message, display in the local application, email, and so forth). In another example, the dynamic seating analysis module 106b can determine that several workspace locations are available that meet the user profile criteria. In this example, the dynamic seating advice module 106c provides (224) the available workspace locations (e.g., in the form of an interactive seating display) to the remote computing device 102—from which the user can select which workspace location he or she would like to reserve. In another example, the dynamic seating analysis module 106b can determine that there are no workspace locations available that meet the criteria established in the user profile. In this example, the dynamic seating advice module 106c provides (224) a message to the remote computing device 102 to alert the user that there are no available workspaces at the facility. The dynamic seating advice module 106c can provide information to the mobile device 102 relating to alternative workspace locations at the facility that are available but do not match the criteria established in the user profile or, in the event that there are no workspaces available at all, the dynamic seating advice module 106c can provide a message to the mobile device 102 indicating that the facility is full.

The systems and methods described herein also provide the unique advantage of dynamically learning based upon monitoring user activity in order to anticipate user needs with respect to workspace reservations and allocate available workspace locations based upon automatic detection of various factors—such as time to travel, mode of transportation, personal priority, user history, facility history (including anticipated fill-up time), presence and/or absence of employees at previously-reserved or utilized workspaces, and other similar factors.

In some embodiments, the employee tracking module 106a automatically monitors the location and movement of employees (either periodically or in real-time) in order to determine whether a workspace is in use. For example, using the facial recognition functionality described above, the employee tracking module 106a can determine that an employee is located at a particular workspace and that the employee has been located at the workspace for a preconfigured amount of time (e.g., fifteen minutes), then the employee tracking module 106a determines that the employee is using that workspace and indicates to the dynamic seating analysis module 106b that the workspace is in use by that employee. The dynamic seating analysis module 106b then marks the workspace as in use in the workspace reservation chart and instructs the dynamic seating advice module 106c accordingly so that the dynamic seating advice module 106c indicates to subsequent users that the specific workspace is not available.

Next, if the employee leaves the workspace, the camera(s) coupled to the facial recognition server 110 capture an empty workspace where the employee was previously detected. The facial recognition server 110 transmits this information to the employee tracking module 106a, and the module 106a determines that the employee has been gone from the workspace for less than a predetermined amount of away time (e.g., two hours). In addition, the employee tracking module 106a learns from the physical access server 112 that the employee has not triggered a physical access event (e.g., swiping a badge) that indicates a departure from the facility, and the module 106a learns from the authentication server 114 that the employee is still logged into the computer terminal located at the workspace. Further, the employee tracking module 106a determines that the current time is still within pre-configured working hours for the facility (e.g., 9:00 am to 6:00 pm). The employee tracking module 106a collates the above data elements to determine that the employee is still using the workspace and instructs the dynamic seating analysis module that the workspace is not available for other users.

Continuing with this example, later in the day the camera(s) coupled to the facial recognition server 110 capture the empty workspace again. The facial recognition server 110 transmits this information to the employee tracking module 106a, and the module 106a determines that the employee has been gone from the workspace for less than a predetermined amount of away time (e.g., two hours). However, a camera positioned at the entrance to the building captured an image of the employee exiting the building seventy-five minutes ago. Further, the employee tracking module 106a learns from the physical access server 112 that the employee has triggered a physical access event (e.g., swiping a badge) that indicates a departure from the facility approximately seventy-six minutes ago, and the module 106a learns from the authentication server 114 that the employee is logged off the computer terminal located at the workspace approximately eighty-two minutes ago. Further, the employee tracking module 106a determines that the current time is outside of pre-configured working hours for the facility (e.g., 9:00 am to 6:00 pm). The employee tracking module 106a collates the above data elements to determine that the employee has left the facility and is no longer using the workspace, and instructs the dynamic seating analysis module that the workspace is now available for other users to use and reserve.

In some embodiments, the modules 106a-106c of the server computing device 106 include functionality that tracks a time of day that the facility has reached capacity or "filled up"—meaning that there are no more available workspaces for subsequent employees to use. For example, the employee tracking module 106a can determine that the facility has reached its capacity at 8:54 am for a particular day. Each day, the module 106a captures this information and stores the data element in the database 108. For future days, the module 106a can analyze the daily fill-up time as historical data in order to determine the average time of day that the facility reaches capacity. For example, the module 106a can determine that the facility usually reaches its capacity at an average time of 9:07 am. The dynamic seating advice module 106c can then utilize this average 'fill-up' time in providing seating and reservation advice to subsequent users as explained below.

As an example, when the dynamic seating advice module 106c receives a request to reserve a workspace from a mobile device 102 (e.g., from an employee who is en route to the facility), the module 106c determines the employee's current location (e.g., using the GPS circuitry and hardware located on the mobile device 102) and requests the employee's current mode of transportation (e.g., car, public transportation, walking) in order to determine an estimated time of arrival for the employee. For example, if the current time is 8:52 am and the employee is currently located fifteen miles away from the facility traveling in a car, the module 106c analyzes data elements like travel routes, speed limits, and traffic estimates to estimate that the employee will arrive at the facility in approximately ten minutes, or at 9:02 am. The module 106c then checks the average facility fill-up time (e.g., 9:07 am) to determine whether the facility will fill up before or after the employee's estimated arrival time. The module 106c also checks check the configurable reservation advice time window (e.g., fifteen minutes). Because the employee's estimated arrival time is close to the fill up time and within the reservation advice time window, then the module 106c transmits a message to the mobile device 102 advising the employee to make a reservation to ensure that a workspace is available upon arrival.

If, for example, the employee's estimated arrival time is earlier than the facility fill-up time and outside of the reservation advice time window (e.g., 8:38 am), then they are advised to just come to the facility and sit at an available workspace without a reservation. If, for example, the employee's arrival time was after the fill-up time and outside of the reservation advice time window (e.g., 9:22 am), then the module 106c can determine whether another nearby facility has available workspaces for the employee. If another facility has available spaces, and the employee would be estimated to arrive at that facility in time, the module 106c transmits a message to the mobile device 102 advising the employee to divert to the alternate location. If no other facility has available workspaces in the time it would take the employee to travel there, then the module 106c transmits a message to the mobile device 102 advising the employee to work from home.

As previously discussed, the modules 106a-106c of the server computing device 106 can monitor the identification, location and movement of employees at the facility, analyze the collected information, generate the workspace reservation chart and provide seating advice to inbound employees via their mobile devices 102 in real time (e.g., via the application installed on the mobile device or via email, text or other communication methods). In some embodiments, the modules 106a-106c also transmit notification messages, alerts and related seating advice to the employee's manager (s) or any other person(s) that the employee may designate as people to be notified of the employee's seating status.

In some embodiments, the server computing device 106 includes functionality to generate reports containing any of the data elements described herein. Example reports include but are not limited to reports of average fill up times for a particular facility (or company-wide) over a given period of time, reports of the identity of employees who have used or reserved a particular workspace over a given period of time, reports of which workspaces are the most or least frequently used, and the like.

The following is an example use case of how the system 100 operates in regard to providing seating and reservation advice to an inbound employee, utilizing a color-coded reservation chart generated by the server computing device 106 and displayed in the application executing on the mobile device 102. A user of mobile device 102 (e.g., an employee en route to work) launches a dynamic seating application installed on the mobile device 102 and provides authentication credentials (e.g., username and password). In some embodiments, the application stores authentication credentials locally on the mobile device 102 (e.g., in an encrypted memory location) and the application automatically authenticates the user upon launching the application. In some embodiments, the application transmits the authentication credentials to the server computing device 106 for authentication.

After authentication, the dynamic seating advice module 106c of the server computing device 106 provides a workspace reservation chart (including all of the underlying information described above) to the mobile device 102 which, in some embodiments, generates a graphical user interface (GUI) using the received information and displays the GUI on the screen of the mobile device 102.

Figure 3:
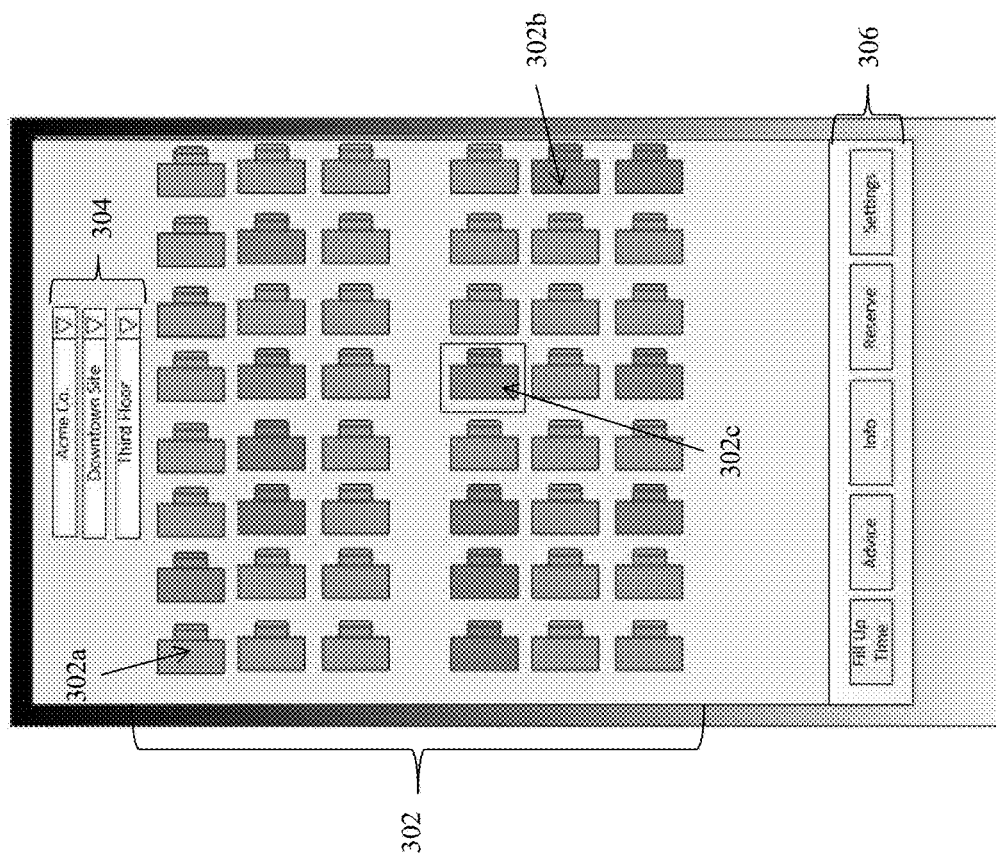
FIG. 3 is a screenshot of a graphical user interface for dynamic seating and workspace planning.

An example of the GUI 300 is shown in FIG. 3. As shown, the GUI 300 includes a color-coded seating chart 302 in the center portion of the screen that displays individual workspaces (e.g., seats, desks, offices) in a particular facility. For example, a workspace that is colored red (e.g., workspace 302a) means that the workspace is already in use and cannot be reserved, a workspace that is colored purple (e.g., workspace 302b) means that the workspace is currently reserved but not yet in use, and a workspace that is colored green (e.g., workspace 302c) means that the workspace is available for use. The drop-down menus 304 located at the top of the screen specify the current parameters for the seating chart (e.g., company name, facility/site location, and floor). The user can select desired parameters to view available seating, or in some embodiments, the application can default these parameters to user-preferred values (such as favorite location or most often visited location). The user interface further includes a series of buttons 306 at the bottom of the screen that enable additional functionality in the application, such as displaying estimated fill-up time, obtaining seating advice, getting detailed information on a particular seat that is in use or reserved (e.g., who is sitting there, what time that person arrived, etc.), requesting reservation of a seat, and editing user settings.

It should be appreciated that in some embodiments, the application on the mobile device 102 periodically receives updated workspace reservation chart information from the server computing device 106 (e.g., at predetermined polling intervals) or substantially in real-time and updates the GUI 300 accordingly. For example, as other employees use the system 100 to make reservations of workspaces, the server computing device 106 can transmit updates to the mobile device application that dynamically affect the information presented to the user of mobile device 102 (e.g., seats automatically change color in the GUI 300, the estimated fill-up time changes, and so forth).

As an example of the functionality of the GUI 300, a user can click the Fill Up Time button and the application displays the estimated time at which the facility is expected to be full (e.g., 9:07 am). The user can then click on a particular workspace (e.g., workspace 302a) to highlight it and then select the Info button. The application displays a pop-up window that contains the name of the person that is currently using the workspace as well as what time that person arrived at the facility. In this manner, a user can determine whether or not he wants to sit near that person.

In another example, an employee can simply click the Advice button to receive seating advice on which workspace (s) are preferred or optimal for the employee based upon his or her user profile (described above) as well as whether the employee should reserve a workspace in advance of arrival, divert to a different facility, or work from home. For example, the Advice button can initiate the transmission of a reservation request from the mobile device 102 to the server computing device 106 as described above with respect to FIGS. 2A and 2B. Upon completing the dynamic seating analysis processing, the modules 106a-106c transmit the seating advice to the mobile device 102 and the advice is displayed to the employee. In some embodiments, the GUI 300 can highlight a particular workspace (e.g., by changing its color to yellow) to indicate that the workspace is available and meets the employee's preferences. If the employee then clicks on the highlighted workspace and selects the Reserve button, the server computing device 106 automatically sets the status of that workspace to Reserved, making it unavailable for reservation by other users.

Of course, the employee can override the seating advice provided by the server computing device 106 and select a different workspace that is available. For example, the employee can interact with the GUI 300 to learn that a colleague, with whom the employee is currently working on an important project, is seated on a different floor than the workspace which was highlighted as a result of the advice received from the server computing device 106. The employee can browse the workspace reservation chart to find the workspace being used by his colleague and determine whether there are any available workspaces in close proximity to the colleague. If so, the employee can click on the available workspace and select the Reserve button to reserve the seat in advance of the employee's arrival. Also, depending on the timing of the employee's estimated arrival (as explained previously), the GUI 300 can advise the employee that a reservation is not required, is recommended, or that there are no workspaces available at the particular facility.

Another important aspect of the systems and methods described herein is the capability for automatic self-learning regarding historical facility usage including fill-up times and user preference information in order to predict future workspace availability and usage. For example, as the system 100 gathers more and more information over time—such as information about the identity of employees that use particular workspaces and facilities, and those employees' related preferences, and information about the overall usage of workspaces and facilities—for storage in the database 108, the system 100 obtains a more thorough understanding of the precise usage of workspaces and can thus provide more accurate seating advice in the future, including leveraging predictive capabilities to proactively offer seating advice to users of the system 100 before those users activate the system 100.

For example, if an employee consistently reserves a certain workspace at a particular facility Monday through Friday at the same time each day, the server computing device 106 can automatically reserve that workspace for the employee on subsequent days and transmit a message to the employee's mobile device 102 each day (e.g., two hours prior to the start of the workday) that informs the employee the workspace has been reserved for his usage. Further, the server computing device 106 can learn (either through the user profile or through other systems such as an employee calendar system) that the employee has scheduled vacation for an upcoming week. As a result, the server computing device 106 can automatically lift the workspace reservation for that employee in advance in order to make it available for other users that week.

It should be appreciated as well that an employee can reserve workspaces according to any number of patterns (e.g., a certain subset of days of the week, certain time blocks during a day, and the like). The server computing device 106 can learn this repeated behavior and automatically reserve a workspace for the employee according to such patterns detected over time.

In addition, if a facility is prone to fill up at a certain time of day during a given season of the year, then the server computing device 106 can determine the fill-up time for the facility not only based on a simple average of time of day, but also take into consideration day of week, and time of year. For example, on Fridays, more people may work from home, so the corresponding fill-up time may be later than another day. In another example, certain holidays may result in the facility never filling up.

Further, the server computing device 106 can determine other aspects of employee seating patterns (such as proximity to other employees and/or proximity to amenities or features of the facility) and automatically reserve a workspace for the employees based upon these aspects. For example, the server computing device 106 can learn that Employee A selects different workspaces during a particular period of time, but always sits next to Employees B and C. As a result, the server computing device 106 can subsequently reserve a workspace for Employee A based upon its location to where Employees B and/or C are sitting. If Employees B and C are not detected in the facility or have not reserved a workspace for the day, the server computing device 106 can evaluate other seating preferences and criteria for Employee A in order to automatically reserve a workspace.

Similarly, the server computing device 106 can learn that Employee A selects different workspaces during a particular period of time, but the workspaces that she selects are always in proximity to a particular feature or amenity of the facility (like windows, aisles, stairs, elevators, cafeteria, and so forth). As a result, the server computing device 106 can subsequently reserve a workspace for Employee A based upon its location to such amenities. If no workspaces are available in proximity to at least one preferred amenity, the server computing device 106 can evaluate other seating preferences and criteria for Employee A in order to automatically reserve a workspace.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of dynamic seating and workspace planning, the method comprising:
   determining, by a server computing device, an identity and a workspace location of each of one or more people within a facility, comprising:
      capturing, by one or more cameras coupled to the server computing device and distributed in different locations in the facility, digital images of the one or more people within the facility;
      extracting, by the server computing device, digitized facial features of the one or more people appearing in the images and comparing the facial features to a database of facial images to identify the one or more people appearing in the images, including segmenting the digitized facial features of the one or more people, creating a 3D digital map of a face of each of the one or more people, and matching the 3D digital map to one or more 2D images from the database of facial images;
      capturing, by one or more hardware devices arranged in a distributed network throughout the facility and coupled to the server computing device, data elements generated from interactions by the one or more people with the one or more hardware devices, wherein the data elements include user identification credentials and user access transactions recorded by the one or more hardware devices;
      analyzing, by the server computing device, the data elements to identify the one or more people interacting with the one or more hardware devices;
      determining, by the server computing device, the workspace location being utilized by each of the identified one or more people within the facility using (i) a physical location associated with a digital image in which the one or more people appears, based upon a physical location of the camera that captured the digital image; and (ii) a physical location associated with at least one of the one or more hardware devices being used by the one or more people, based upon a physical location of the one or more hardware devices;

generating, by the server computing device, a workspace reservation chart indicating a portion of workspace locations currently being used and a portion of workspace locations reserved for future use;

receiving, by the server computing device, a request from a remote computing device to reserve a workspace location within the facility, the request including an identifier associated with a requesting user;

retrieving, by the server computing device, a user profile based upon the requesting user identifier, the user profile including workspace location preferences and workspace capability preferences of the requesting user;

determining, by the server computing device, an available workspace location for the requesting user based upon the user profile and the workspace reservation chart, comprising:
(a) determining a geographic location of the remote computing device in relation to the facility and a mode of transportation of the requesting user;
(b) determining an estimated time of arrival for the requesting user based upon the geographic location and the mode of transportation;
(c) comparing the estimated time of arrival with a time that the facility is expected to reach capacity; and
(d) generating seating advice based upon step (c), wherein:
when the estimated time of arrival is within a predetermined reservation time window and one or more workspace locations are available:
the computing device transmits a message to the remote computing device to recommend that the requesting user reserve a workspace location before arriving;
when the estimated time of arrival is before the time that the facility is expected to reach capacity, is outside the predetermined reservation time window, and one or more workspace locations are available: transmitting a message to the remote computing device to inform the requesting user to select a workspace location upon arrival; and
when the estimated time of arrival is after the time that the facility is expected to reach capacity and is outside the predetermined reservation time window: transmitting a message to the remote computing device to inform the requesting user that no workspaces are available at the facility; and providing, by the server computing device, the available workspace location to the remote computing device for display.

2. The method of claim 1, wherein capturing data elements generated from interactions by the one or more people with the one or more hardware devices comprises capturing, by the one or more hardware devices, one or more physical access events relating to interactions with security system hardware controlling physical access to locations within the facility.

3. The method of claim 2, wherein the interactions with security system hardware comprise presenting an access credential to a security reader.

4. The method of claim 3, wherein the access credential includes an access badge, a biometric data element, or a passcode.

5. The method of claim 1, wherein capturing data elements generated from interactions by the one or more people with the one or more hardware devices comprises capturing, by the one or more hardware devices, one or more logical access events relating to interactions with computing devices located at a workspace location.

6. The method of claim 5, wherein the interactions with computing devices comprise entering authentication credentials to log into the computing devices.

7. The method of claim 1, wherein providing the available workspace location to the remote computing device further comprises:
providing, by the server computing device, the workspace reservation chart to the remote computing device; and
generating, by the server computing device, a graphical user interface for display on the remote computing device, the graphical user interface including a color-coded seating chart indicating which workspace locations are available, which workspace locations are reserved for future use, and which workspace locations are in use.

8. The method of claim 1, wherein determining an available workspace location further comprises analyzing, by the server computing device, historical facility workspace data and historical user workspace data to predict current availability of workspace locations.

9. The method of claim 8, further comprising automatically reserving, by the server computing device, a workspace location for the requesting user based upon the analysis of the historical facility workspace data and the historical user workspace data.

10. The method of claim 1, further comprising when no workspaces are available at the facility and one or more workspaces are available at alternate facilities, transmitting, by the server computing device, a message to the remote computing device to divert the requesting user to one of the alternate facilities.

11. The method of claim 1, further comprising:
monitoring, by the server computing device, the captured digital images and the captured data elements to determine whether a previously identified person is still present at the workspace location;
when the previously identified person is no longer present at the workspace location:
determining, by the server computing device, a period of time since the previously identified person was present at the workspace location;
determining, by the server computing device, whether any of the interactions by the previously identified person with the one or more hardware devices indicate that the previously identified person has left the facility; and
making, by the server computing device, the workspace location available for use by others when the period of time since the previously identified person was present at the workspace location exceeds a predetermined threshold or when an interaction by the previously identified person with the one or more hardware devices indicates that the previously identified person has left the facility.

12. The method of claim 11, further comprising
comparing, by the server computing device, a current time with predetermined working hours of the facility; and making, by the server computing device, the workspace location available for use by others when the current time is outside of the predetermined working hours, and when the period of time since the previously identified person was present at the workspace location exceeds a predetermined threshold or when an interaction by the previously identified person with the one or more hardware devices indicates that the previously identified person has left the facility.

13. A system for dynamic seating and workspace planning, the system comprising a server computing device configured to:
   determine an identity and a workspace location of each of one or more people within a facility, comprising:
      capturing, by one or more cameras coupled to the server computing device, digital images of the one or more people within the facility;
      extracting digitized facial features of the one or more people appearing in the images and comparing the facial features to a database of facial images to identify the one or more people appearing in the images, including segmenting the digitized facial features of the one or more people, creating a 3D digital map of a face of each of the one or more people, and matching the 3D digital map to one or more 2D images from the database of facial images;
      capturing, by one or more hardware devices distributed throughout the facility and coupled to the server computing device, data elements generated from interactions by the one or more people with the one or more hardware devices, wherein the data elements include user identification credentials and user access transactions recorded by the one or more hardware devices;
      analyzing the data elements to identify the one or more people interacting with the one or more hardware devices;
      determining the workspace location being utilized by each of the identified one or more people within the facility using (i) a physical location associated with a digital image in which the one or more people appears, based upon a physical location of the camera that captured the digital image; and (ii) a physical location associated with at least one of the one or more hardware devices being used by the one or more people, based upon a physical location of the one or more hardware devices;
   generate a workspace reservation chart indicating a portion of workspace locations currently being used and a portion of workspace locations reserved for future use;
   receive a request from a remote computing device to reserve a workspace location within the facility, the request including an identifier associated with a requesting user;
   retrieve a user profile based upon the requesting user identifier, the user profile including workspace location preferences and workspace capability preferences of the requesting user;
   determine an available workspace location for the requesting user based upon the user profile and the workspace reservation chart, comprising:
      (a) determining a geographic location of the remote computing device in relation to the facility and a mode of transportation of the requesting user;
      (b) determining an estimated time of arrival for the requesting user based upon the geographic location and the mode of transportation;
      (c) comparing the estimated time of arrival with a time that the facility is expected to reach capacity; and
      (d) generating seating advice based upon step (c), wherein:
         when the estimated time of arrival is within a predetermined reservation time window and one or more workspace locations are available:
            the computing device transmits a message to the remote computing device to recommend that the requesting user reserve a workspace location before arriving;
         when the estimated time of arrival is before the time that the facility is expected to reach capacity, is outside the predetermined reservation time window, and one or more workspace locations are available: transmitting a message to the remote computing device to inform the requesting user to select a workspace location upon arrival; and
         when the estimated time of arrival is after the time that the facility is expected to reach capacity and is outside the predetermined reservation time window: transmitting a message to the remote computing device to inform the requesting user that no workspaces are available at the facility; and
   provide the available workspace location to the remote computing device for display.

14. The system of claim 13, wherein capturing data elements generated from interactions by the one or more people with the one or more hardware devices comprises capturing, by the one or more hardware devices, one or more physical access events relating to interactions with security system hardware controlling physical access to locations within the facility.

15. The system of claim 14, wherein the interactions with security system hardware comprise presenting an access credential to a security reader.

16. The system of claim 15, wherein the access credential includes an access badge, a biometric data element, or a passcode.

17. The system of claim 13, wherein capturing data elements generated from interactions by the people with the one or more hardware devices comprises capturing, by the one or more hardware devices, one or more logical access events relating to interactions with computing devices located at a workspace location.

18. The system of claim 17, wherein the interactions with computing devices comprise entering authentication credentials to log into the computing devices.

19. The system of claim 13, wherein providing the available workspace location to the remote computing device further comprises
   providing the workspace reservation chart to the remote computing device; and
   generating a graphical user interface for display on the remote computing device, the graphical user interface including a color-coded seating chart indicating which workspace locations are available, which workspace locations are reserved for future use, and which workspace locations are in use.

20. The system of claim 13, wherein determining an available workspace location further comprises analyzing historical facility workspace data and historical user workspace data to predict current availability of workspace locations.

21. The system of claim 20, wherein the server computing device is configured to automatically reserve a workspace location for the requesting user based upon the analysis of the historical facility workspace data and the historical user workspace data.

22. The system of claim 13, wherein when no workspaces are available at the facility and one or more workspaces are available at alternate facilities, the server computing device transmits a message to the remote computing device to divert the requesting user to one of the alternate facilities.

23. The system of claim 13, wherein the server computing device further:
monitors the captured digital images and the captured data elements to determine whether a previously identified person is still present at the workspace location;
when the previously identified person is no longer present at the workspace location:
determines a period of time since the previously identified person was present at the workspace location;
determines whether any of the interactions by the previously identified person with the one or more hardware devices indicate that the previously identified person has left the facility; and
makes the workspace location available for use by others if the period of time since the previously identified person was present at the workspace location exceeds a predetermined threshold or if an interaction by the previously identified person with the one or more hardware devices indicates that the previously identified person has left the facility.

24. The method of claim 23, wherein the server computing device further:
compares a current time with predetermined working hours of the facility; and
makes the workspace location available for use by others when the current time is outside of the predetermined working hours, and when the period of time since the previously identified person was present at the workspace location exceeds a predetermined threshold or when an interaction by the previously identified person with the one or more hardware devices indicates that the previously identified person has left the facility.

25. A computer program product comprising a non-transitory computer readable storage device storing thereon software for dynamic seating and workspace planning which, upon execution by a server computing device, causes the server computing device to:
determine an identity and a workspace location of each of one or more people within a facility, comprising:
capturing, by one or more cameras coupled to the server computing device, digital images of the one or more people within the facility;
extracting digitized facial features of the one or more people appearing in the images and comparing the facial features to a database of facial images to identify the one or more people appearing in the images, including segmenting the digitized facial features of the one or more people, creating a 3D digital map of a face of each of the one or more people, and matching the 3D digital map to one or more 2D images from the database of facial images;
capturing, by one or more hardware devices distributed throughout the facility and coupled to the server computing device, data elements generated from interactions by the one or more people with the one or more hardware devices, wherein the data elements include user identification credentials and user access transactions recorded by the one or more hardware devices;
analyzing the data elements to identify the one or more people interacting with the one or more hardware devices;
determining the workspace location being utilized by each of the identified one or more people within the facility using (i) a physical location associated with a digital image in which the one or more people appears, based upon a physical location of the camera that captured the digital image; and (ii) a physical location associated with at least one of the one or more hardware devices being used by the one or more people, based upon a physical location of the one or more hardware devices;
generate a workspace reservation chart indicating a portion of workspace locations currently being used and a portion of workspace locations reserved for future use;
receive a request from a remote computing device to reserve a workspace location within the facility, the request including an identifier associated with a requesting user;
retrieve a user profile based upon the requesting user identifier, the user profile including workspace location preferences and workspace capability preferences of the requesting user;
determine an available workspace location for the requesting user based upon the user profile and the workspace reservation chart, comprising:
 (a) determining a geographic location of the remote computing device in relation to the facility and a mode of transportation of the requesting user;
 (b) determining an estimated time of arrival for the requesting user based upon the geographic location and the mode of transportation;
 (c) comparing the estimated time of arrival with a time that the facility is expected to reach capacity; and
 (d) generating seating advice based upon step (c), wherein:
  when the estimated time of arrival is within a predetermined reservation time window and one or more workspace locations are available:
   the computing device transmits a message to the remote computing device to recommend that the requesting user reserve a workspace location before arriving;
  when the estimated time of arrival is before the time that the facility is expected to reach capacity, is outside the predetermined reservation time window, and one or more workspace locations are available: transmitting a message to the remote computing device to inform the requesting user to select a workspace location upon arrival; and
  when the estimated time of arrival is after the time that the facility is expected to reach capacity and is outside the predetermined reservation time window: transmitting a message to the remote computing device to inform the requesting user that no workspaces are available at the facility; and
provide the available workspace location to the remote computing device for display.

* * * * *